United States Patent
Gustafsson

(10) Patent No.: US 10,675,531 B2
(45) Date of Patent: Jun. 9, 2020

(54) CONTROLLING USER INTERFACES

(71) Applicant: KING.COM LIMITED, St. Julians (MT)

(72) Inventor: Bjorn Gustafsson, Malmo (SE)

(73) Assignee: KING.COM LTD., St. Julians (MT)

(*) Notice: Subject to any disclaimer, the term of this patent is extended or adjusted under 35 U.S.C. 154(b) by 7 days.

(21) Appl. No.: 16/017,089

(22) Filed: Jun. 25, 2018

(65) Prior Publication Data
US 2019/0388780 A1   Dec. 26, 2019

(51) Int. Cl.
| | |
|---|---|
| *A63F 9/24* | (2006.01) |
| *A63F 13/00* | (2014.01) |
| *G06F 17/00* | (2019.01) |
| *A63F 13/2145* | (2014.01) |
| *H04M 1/725* | (2006.01) |
| *G06F 3/0488* | (2013.01) |
| *A63F 13/80* | (2014.01) |

(52) U.S. Cl.
CPC .......... *A63F 13/2145* (2014.09); *A63F 13/80* (2014.09); *G06F 3/04883* (2013.01); *H04M 1/72544* (2013.01)

(58) Field of Classification Search
CPC .............................. A63F 9/0612; A63F 9/0803
See application file for complete search history.

(56) References Cited

U.S. PATENT DOCUMENTS

| | | | | |
|---|---|---|---|---|
| 7,144,322 B2* | 12/2006 | Gomez | ................... | G07F 17/32 463/20 |
| 2003/0157981 A1* | 8/2003 | Marks | ..................... | G07F 17/32 463/20 |

OTHER PUBLICATIONS

Collapse—Wikipedia Article, May 8, 2018, https://en.wikipedia.org/w/index.php?title=Collapse!&oldid=840266935 (Year: 2018). 4 Pages.*

Anthony, Sean, Pop Into Shape: Puyo Puyo Tetris Review, Oct. 26, 2017, https://gamingtrend.com/feature/reviews/pop-into-shape-puyo-puyo-tetris-review (Year: 2017). 10 Pages.*

* cited by examiner

*Primary Examiner* — Kang Hu
*Assistant Examiner* — Jason Pinheiro
(74) *Attorney, Agent, or Firm* — Saul Ewing Arnstein & Lehr LLP

(57) ABSTRACT

A mechanism for refilling an electronic game board after game elements of different game types, for example those referred to as 'clickers' or 'linkers,' have been removed through play. In these games, a player must identify a group of matching game elements on a game board, select (or click on) a game element within the group. This causes the group of selecting matching game elements to be removed. A refill process is then executed to replenish the game board with new game elements. When competitors at remote devices are playing the same game board, there is a requirement to keep the game board aligned as play progresses. The present invention addresses the latency problem by enabling independent refill at respective computer devices which are engaged in a competitive game. The refill process may also be utilised on a single computer device where a single player is playing a game.

20 Claims, 13 Drawing Sheets

CONTROLLING USER INTERFACES

TECHNICAL FIELD OF THE INVENTION

The present invention relates to controlling user interfaces of computer devices in response to user engagement with displayed elements on the interface. The invention relates particularly but not exclusively to controlling user interfaces at computer devices at which users are engaged with the same application.

BACKGROUND OF THE INVENTION

With the increasing number of games available to be played on individual user devices, such as smartphones or tablets, there is an increase in the number of competitive games. Such competitive games enable users to play against each other, each user playing at their own device while following the progress of another user playing the game at their respective device. Such competitive games encourage user engagement, but there are significant challenges arising from the need to continually communicate information about user play at one device to another device. These devices may be connected via a communication network such as the Internet and there may be inherent latencies in conveying updates from one device to another. Even if this latency is in reality quite short, nevertheless, a player who is playing a game may be constantly waiting to receive an update from another player before he can continue his next move.

Another cause of latency perceived by a local player is the time it takes another player to consider and make his move.

The challenge addressed with the present disclosure is to overcome the problem of latency when playing competitive games on multiple remote computer devices.

SUMMARY OF THE INVENTION

In addressing the challenge which has been identified above of reducing latency, the inventors have devised a new mechanism for refilling a game board after game elements had been removed through play. Game elements may be removed in play in a number of different game types, for example those referred to as 'clickers' or 'linkers'. In these games, a player must identify a group of matching game elements on a game board, select (or click on) a game element within the group. This causes the group of selecting matching game elements to be removed. A refill process is then executed to replenish the game board with new game elements. When competitors at remote devices are playing the same game board, there is a requirement to keep the game board aligned as play progresses. The techniques developed by the present inventors address the latency problem by enabling independent refill at respective computer devices which are engaged in a competitive game. However, the refill process may also be utilised on a single computer device where a single player is playing a game.

One aspect of the present invention provides
a method of controlling a user interface of a computer device, the computer device executing a computer executable game playable by a user at that computer device, the method comprising:

rendering on the user interface an initial game board comprising a plurality of user selectable game elements of at least first and second types arranged on respective tiles, detecting that a user has selected a group of adjacent game elements of the same type, removing game elements in the selected group, executing a refill process wherein vacancies left as a result of removing the game elements are filled by moving existing game elements of the game board into the vacancies and spawning at least one new game element to complete a next game board, wherein the tiles of the game board are arranged in multiple sets, each set controlled by respective deterministic game element generating algorithm which spawns a new game element in a deterministic manner for its associated set.

The sets of tiles may be static. It is possible for the sets to be dynamic, but in that case each device must keep track of the changes in the sets.

In one embodiment the tiles are arranged in an array of rows and columns on the game board, and each set may comprise a row, column, or n by m grid of the array.

In one embodiment, each set has a tile identified as an entry point, the next game element in the deterministic sequence being spawned at the entry point.

Where there is more than one vacancy in the set, the next game element spawned at the entry point moves to a next vacant tile in a predetermined tile pattern in the set, and a further next game element is spawned at the entry point.

The method may comprise the step of transmitting to a remote computer device at which the computer executable game is being played by another user an update message identifying game elements for updating the game board at the remote computer device.

The method may comprise the step of receiving an update message from a remote computer device at which the computer executable game is being played by another user, the update message identifying game elements which have been removed from the game board at the remote device. Such elements may be removed from the game board at the computer device and the refill process executed. The refill process may be executed independently of transmission of the update messages, to allow a player to continue playing at his device.

The deterministic game element generating algorithm may operate according to the same rules for each set or different spawning rules for each set. This can allow different types of elements to be spawned at different locations on the game board with differing probabilities.

Another aspect of the invention provides a method of controlling at least first and second user interfaces of respectively first and second computer devices, each computer device executing an instance of a computer executable game, playable by a first user at the first computer device independently of a second user at the second computer device, the method comprising:

rendering on each of the first and second user interfaces an initial game board comprising a plurality of user selectable game elements of at least first and second types, arranged on respective tiles of the game board, wherein the initial game board rendered on the first computer device is the same as the initial game board rendered on the second computer device, rendering on each user interface both a first player zone and a second player zone, the first and second player zones associated respectively with the first and second user, detecting, at the first user interface, that a user has selected a group of adjacent game elements of the same type, removing the game elements in the selected group from the first interface, executing a refill process wherein the vacancies left as a result of removing the game elements are filled by moving existing game elements of the game board into the vacancies and spawning at least one new game element to complete a next game board, extending the player zone of the first user if the selected group comprises at least one game element in the player zone associated with that user, wherein spawning the new game element comprises generating one or more new game element for at least one of a plurality of sets of tiles on the first user interface independently of generating one or more new game elements for at least one of a plurality of sets of tiles on the second user interface according to a deterministic game element generating process whereby the sequence of game element types spawned for each set is the same for each user interface.

The sets of tiles may be static and not modifiable during play.

The sets of tiles are intended to be different from the player zones. Player zones are defined to indicate the relative status of the players, whereas the sets are used to enable refill at each device.

The above method may comprise the step of transmitting an update message from the first computer device to the second computer device, the update message identifying removed game elements.

The above method may comprise the step of receiving the update message at the second computer device and executing the refill process to refill vacancies indicated by the removed game elements in the update message.

The above method may comprise the step of transmitting a player zone update message between the first and second computer devices comprising identifiers of tiles that have changed a player status as a result of extending the player zone.

When the player zone update message is received, the method visually indicates the extended player zone based on the tile identifiers.

Another aspect of the invention provides a computer device comprising:

a user interface, one or more processor configured to execute a computer executable game to be played by a user at the computer device, the processor configured to:

render on the user interface an initial game board comprising a plurality of user selectable game elements of at least first and second types arranged on respective tiles, detect that a user has selected a group of adjacent games elements of the same type, remove game elements in the selected group, and execute a refill process wherein vacancies left as a result of removing the game elements are filled by moving existing game elements of the game board into the vacancies and spawning at least one new game element to complete a next game board wherein tiles of the game board are arranged in multiple sets, each set controlled by a respective of deterministic game element generating algorithm of a game element generator to spawn the new game element in a deterministic manner for its associated set.

The computer device may comprise a network interface, wherein the one or more processors is configured to transmit via the network interface an update message to a remote computer device, the update message identifying removed game elements.

The network interface may be configured to receive an update message from a remote computer device, the update message identifying game elements removed from a game board on a remote computer device, wherein the one or more processors is configured to remove the identified game elements from the game board and to execute the refill process to replace them.

A further aspect of the invention provides a non transitory computer readable medium comprising computer readable instructions which when executed by a processor causes the methods as herein defined to be performed.

For a better understanding of the present invention and to show how the same may be carried into effect, reference will now be made by way of example to the accompanying drawings.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF THE INVENTION

The present disclosure describes a technique for spawning new blocks, herein sometimes referred to as game elements or objects, onto a game board from which blocks have been removed as a result of game play. The technique is used as part of the refill process to replenish a game board after blocks have been removed in play.

There is described later a competitive game using a clicker mechanic, in which a player playing the game at one device can compete with an opponent playing at another device. In such a competitive game, a player at his own device needs to be able to play his own game, but also needs to understand the play of the player at the other device. In order to do this, moves which have resulted from player interaction at his own device are shown on his own game board, and also moves following interaction of the other player at the other device are shown on the first player's game board also. This allows a player at his own device to see how he is doing relative to his opponent. In the game which is described later, there is a competition for territory in the game board.

When operating in any real environment, it is not possible to instantly update both client devices with moves from the other device. Therefore, in existing competitive schemes, one player makes a play, the update is passed to the other player, and then he makes a play. This can significantly detract from the enjoyment of the game. The challenge therefore is to enable each player to be able to play substantially in real time at their own device, but nevertheless to be able to track their progress with respect to the other player. Tracking the progress of another player is not just in terms of a progress bar or score, but being able to update the present player's gameboard with the moves made by the other player. The challenge is to enable local play in real time without having to wait for another player to make a move, and for that move to be updated on the local gameboard. In particular, in order to carry on play in real-time, the local device needs to be able to be replenished with blocks as blocks are removed in game play by the local player. This has to be carried out in such a fashion that it is possible to make the same refills at the remote device, in order to update the remote device with the user moves.

Figure 1A:
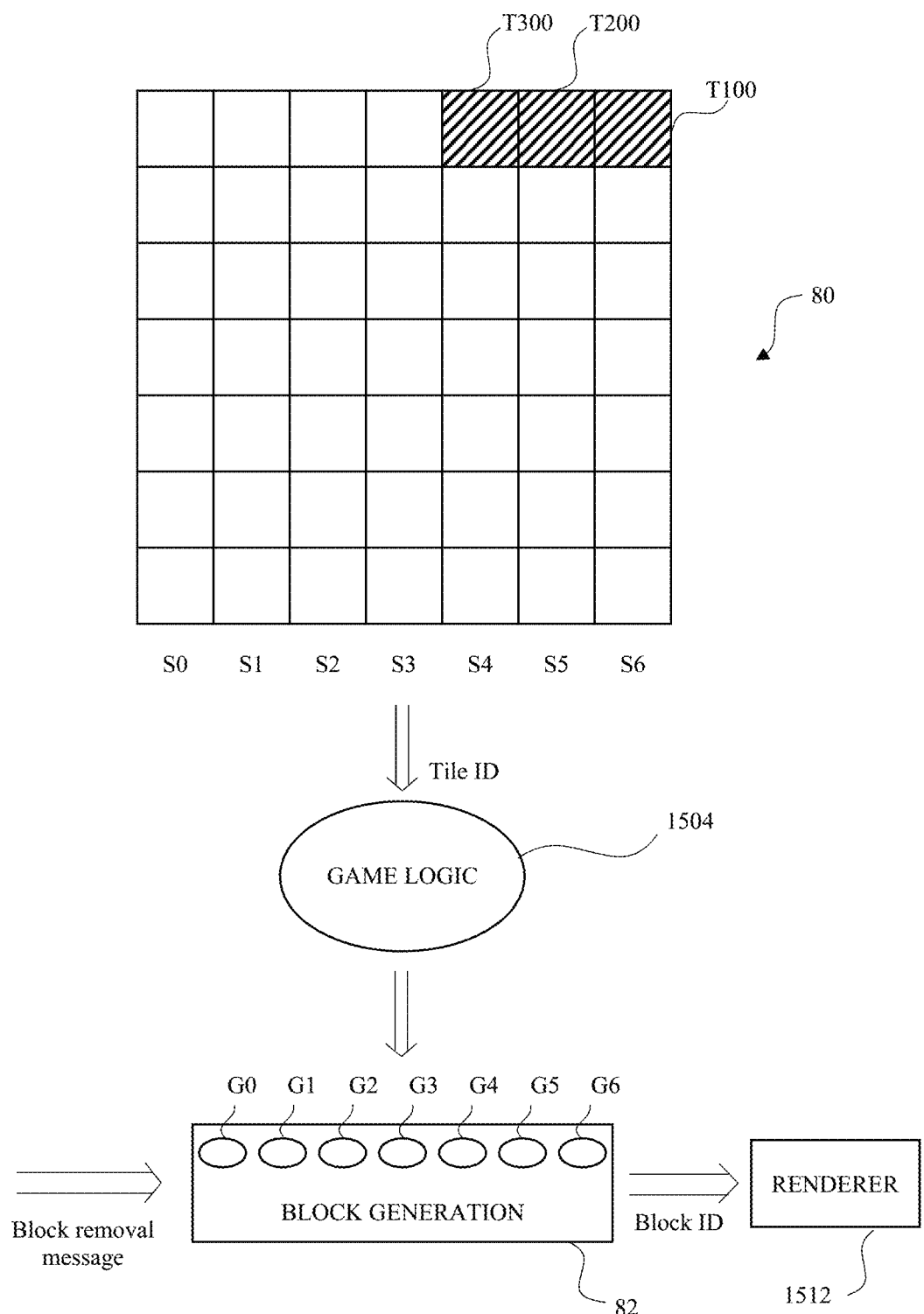
FIGS. 1A and 1B are schematic block diagrams illustrating a refill process.
Figure 1B:
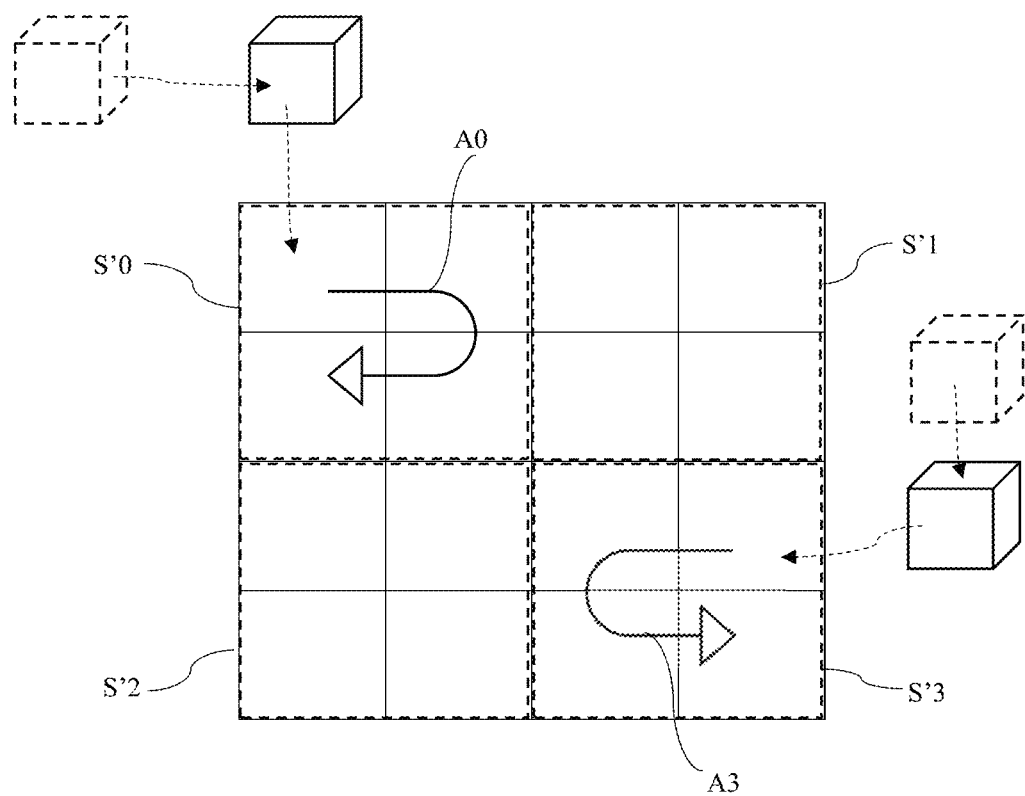

FIGS. 1A and 1B are schematic block diagrams of the techniques which enables this to be achieved. FIGS. 1A and 1B are highly schematic but illustrate the core principles.

FIG. 1A shows a tile grid 80. This tile grid shows an array of tiles arranged in rows and columns. In order to render a game board on a display, each tile is associated with a block to be rendered at that tile location. The grid 80 is organised in sets S0 to S6. In this embodiment, each set represents a column of tiles in the array. However, sets may be organised in any appropriate manner. For example, they could be a row or a grid of tiles. What is important is that each set is predetermined and fixed (static) in association with block generation logic to be described later. These sets are not therefore to be confused with territories or zones when a player is playing a competitive game where they are competing over territory. The sets do not form part of the game play, but instead allow for block generation to be carried out in a deterministic manner as further described.

Shown in the tile grid 80 are three tiles T100, T200 and T300 which represent tiles where blocks need to be spawned. A new block is spawned into effect at an entry point of the set. For convenience, the endmost tile (in this case T100) can be considered the entry point for S6. However, any entry point for a set can be defined, and the precise entry point may depend on the orientation or shape of the set. Blocks are spawned into sets at their respective entry points. If the tile below the entry point is vacant, the spawned block is moved down to that tile and then a further block is spawned above it at the entry point. Note that sets may be of different configurations and spawned blocks may be moved to vacant tiles according to different physics, provided only that it is deterministic across playing devices.

The game includes block generation logic 82 which comprises a plurality of deterministic game element generating algorithms labelled G0 to G6. Each set is associated with a respective game element generating algorithm which spawns the new game element in a deterministic manner for its associated set. Game logic 1504 receives a tile identifier indicating a tile into which a block is to be spawned. That is, the tile identifier indicates the set in which the tile belongs, and enables the entry point of the set to be indicated. This tile identifier enables the appropriate algorithm to be activated, and a block identifier is generated by that algorithm to a renderer 1512 which controls a display 1318 on which the game board is presented to cause that block to be inserted at the entry point. Within each set the process is entirely deterministic. That is, blocks are provided in a predetermined sequence into the set, and moved through the set in a predetermined way. That sequence may be the same for all sets, or each set may have a different sequence, but what is important is that each set has a deterministic refill process.

This enables low latency competitive play, because it is now possible to provide a similar block generation logic 82 at each device which is playing a game. Each device does not have to know what blocks are being refilled at the other device, because it will deterministically select the same block for refill in the same tile location based on its own deterministic generators. What is important therefore is that the generator for each set (for example generator G6 to set S6) on one client device operates with the same deterministic sequence of the generator G6 for set S6 on the other client device.

Each generator G0 to G6 can be controlled with a respective seed which then causes a pseudo-random sequence of blocks to be generated based on that seed. It is of course necessary that the seed for the generator G6 at one client device is the same as the seed for a generator e.g. G6 at another client device in order to make sure that the same sequence of blocks is generated.

As mentioned, sets may take any form. FIG. 1B is a schematic diagram showing sets having a different configuration than rows and columns, as in FIG. 1A. FIG. 1B shows 16 tiles of a grid, organised into four sets S '0, S '1, S '2 and S '3. Each set comprises four tiles arranged in a grid. The arrows A0, A3, denote the physics within each group. In the set S '0, the top left hand tile is the entry point of the set. New blocks are spawned here. If when the new block is spawned the tile immediately to the right of it is vacant, the spawned block will move into that tile, and a new block will be spawned into the entry point. Blocks are shown three-dimensionally to indicate that they are different from tiles. Thus, in the set S '0 one can consider a clockwise physics. In set S '3, the arrow A3 moves in an anticlockwise direction denoting an anti-clockwise refill physics. Any refill physics is possible. Note that it is not necessary that the tile into which a spawned block moves after spawning at the entry point tile is adjacently the entry point tile. It could be diagonally away from it or in some other location within the set. All that matters is that there is a deterministic physics which means that the blocks spawned at the entry point always move to the next predetermined tile in the set, and from there to another next predetermined tile. This deterministic process must be the same at each of the player devices.

As a result of this, game play at each device may continue more or less in real time as the game board is refilled. Refills will be made to accommodate the play of the user at that device. Periodically, updates are sent from one client device to another. An update identifies blocks which have been deleted by play at the device from which the update is sent, but does not have to identify the blocks which will be used to refill the gameboard at the receiving device. Once the device receiving the update knows which tiles need to be replenished, it can operate its block generation logic according to the tile identifiers of deleted blocks. This is indicated by the message denoted block removal message in FIG. 1A which is shown schematically as coming from a remote device, rather than from the local grid.

When playing certain types of games, block generation may satisfy certain rules to make the game more interesting or entertaining. For example, in PET RESCUE SAGA™ discussed below, block spawning rules may define that pets (which would constitute a block in this example) are spawned in one corner of the game board. With known block generators, this is achieved by applying weightings to the block generation process. In the technique described herein, weightings can be applied per set to achieve similar effects. Once again, all that is important is that the same weightings are applied in the same respective generator at each device.

Figure 2:
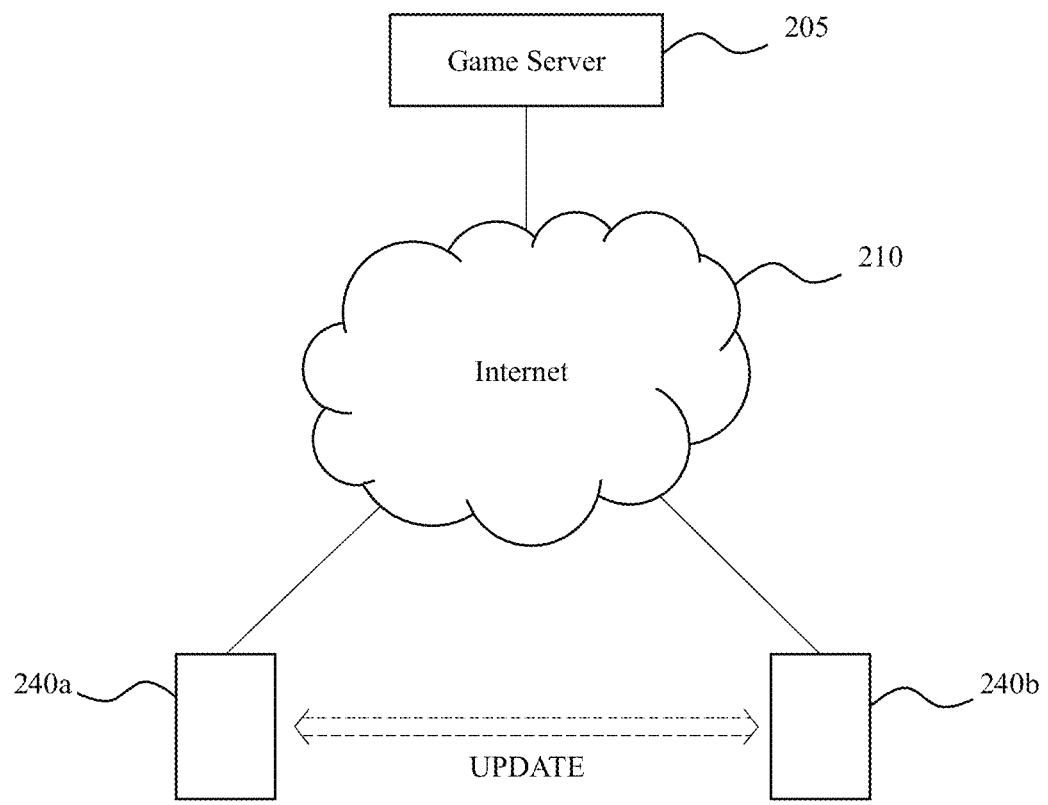
FIG. 2 is a schematic block diagram illustrating an environment for playing a competitive game.

FIG. 2 portrays an exemplary overall environment in which such a competitive game may be played. A virtual game is stored on, for instance, a game server 205. The virtual game is played on a client device 240A, 240B. These client devices may be computers, smartphones or any other handheld devices such as tablets et cetera. The client device can also be a kiosk, arcade gaming station, smart TV or any other device with computing capabilities, input devices and a screen that can present the game to a user. The client devices communicate with the game server 205 via a communication network such as the Internet 210. While the update messages are shown in dotted lines going between the client devices it, will be appreciated that these update messages in fact may travel via the communication network, and via the game server. That is, they would form part of the communication channel which the game server provides between the client devices in order to enable competitive gameplay. Note that in addition to providing the update messages, the game server controls their respective displays to provide the other competitive game features described later, for example indicating respective progress et cetera.

The following implementation refers to a game with a 'clicker' mechanic. The ideas explained herein may be implemented in games with other mechanics.

A clicker mechanic is one in which a group of two or more adjacent matching objects (herein referred to as blocks or game elements) are selected and automatically removed. In this context, 'matching' means that the objects are of the same type, that is they share at least one of the same characteristic such as colour, shape or image. Matches could be made using one common characteristic or multiple characteristics, depending on how 'type' is defined in a particular game.

To exemplify the invention, one particular game will now be described. It will be evident that the features described herein may be applied in many different games.

Pet Rescue Saga™ is an action puzzle game created by King.com. A player can make his way through a variety of levels in this clicker style adventure as he rescues pets from various situation, avoiding various obstacles, and fulfilling the ultimate objective of rescuing the pre-determined number of pets to successfully complete one level and move onto the next. Levels are presented to the player on a virtual map, along which he progresses as he completes levels.

The described game belongs to the (match-2) clicker genre. To play the game, a user clicks on any group of two or more touching blocks of the same colour. This causes them to be removed from the game board.

Once the selected blocks have been removed, the blocks above the cleared group fall down to fill the gaps (vacancies) created by the cleared blocks. Blocks may also slide sideways to fill gaps or fill according to any physics. Some gaps may not be filled by these blocks, for example, when the gap created by the block which was clicked on is to be replenished with a booster. In addition, gaps are left by the blocks which have moved into the vacancies created by removing the matched group. These are filled by spawning new blocks under the control of a block generator, as described above.

The game board is defined by the grid 80. A tile is a location which may support a block or have another quality e.g. a hole or blocker. Each tile has its own unique name associated with it. The data structure which supports the grid is described in more detail later.

Holes in the grid show the background and are not valid game board areas. Blocks cannot occupy holes in the game board, but can fall through them. The shape of the grid may vary. Blocks may also fall through a clicked game element, but cannot fall through blocks which are remaining on the game board.

Figure 3:
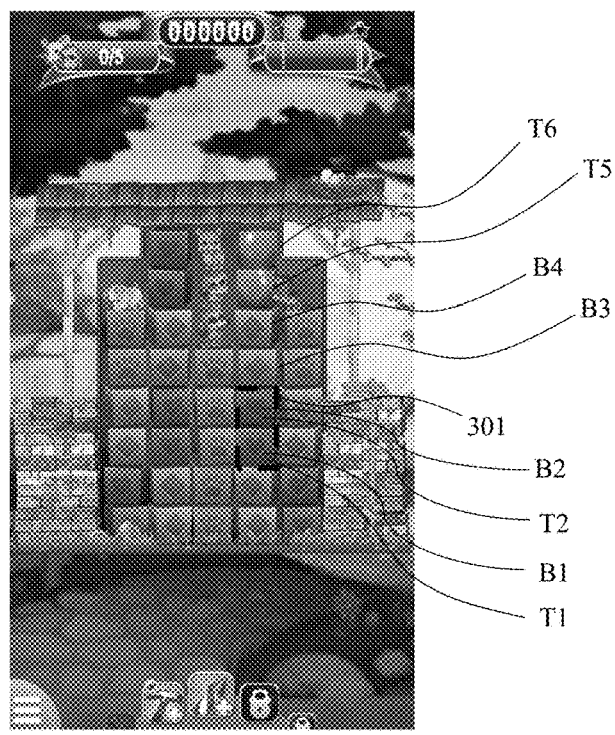
FIG. 3 illustrates a user device with a known clicker game, Pet Rescue Saga™.

FIG. 3 shows an example of a level in a known clicker game, in this case Pet Rescue Saga™. A group 301 of tiles T1, T2 with blocks B1, B2 has a dotted line around it. These blocks are all of the same type, in this case, their colour characteristic matches and they can all be removed by clicking any one of the blocks within the group. If a block is selected which does not have any matching adjacent blocks, it remains on the game board in its current location.

The blocks B3, B4 drop down to fill the gaps on tiles T1, T2, and the blocks above B3, B4 continue to fall down until they cannot fall further. This leaves vacancies on the uppermost tiles T5, T6. New blocks may be spawned in a sequence to drop down from the top edge of the game board (tile T6) into the gaps below, in this case on tile T5 to fill any holes.

Whether the colour characteristics of adjacent blocks match is determined by a match check. This check is carried out for the whole game board where there are blocks. All blocks on the game board are match checked against the blocks immediately adjacent to them. When multiple blocks are detected to have matching characteristics, a group of blocks is formed such that even blocks which are not directly adjacent to each other are included in the same group as long as they are connected in an adjacent manner (i.e. not diagonally) via other blocks which also possess the same matching characteristic. The match check is implemented before the player clicks on a block. If the player hovers over one of a group of two or more matching blocks with their selector, a glow or shimmer will appear around the group. The shimmer appears only around the specific block to be selected when no adjacent matches are found. An algorithm implemented in a game code executed by a processor performs a match check for each position that the selector passes over. If any match is detected, the algorithm presents a shimmer or a glow around the group of matching blocks.

There follows a description of a multiplayer variation of a game involving clicker mechanics. It should be appreciated that it may be implemented in games using other mechanics, such as linkers. In a linker, a group of matching blocks may be selected for removal by tracking them in sequence to define the particular group.

The following example is of a competitive game between two players. It should be appreciated that the game may be played between more than two players. If there are more than two players, the players may all compete against each other, or they may work collaboratively in teams as, for example, in a 2 vs. 2 game. This multiplayer game is separate from the players' main progression through the levels, and players only compete if they choose a separate icon on the virtual path display.

Figure 4:
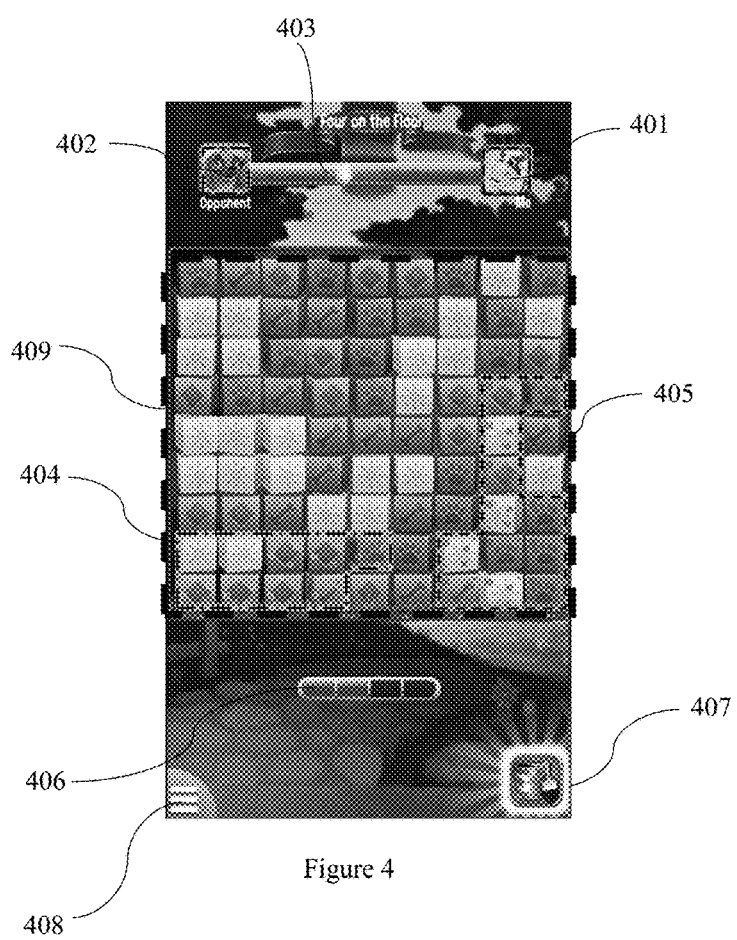
FIGS. 4 to 9 illustrate the screen of a computer device with differing stages in competitive gameplay.

FIG. 4 shows an example of a display displayed to the user on his client device 240a during gameplay of the two-player version of the game. The user who is playing on client device 240a is represented by image 401. His opponent is represented by image 402. The opponent is playing the game at his client device 240b, which can communicate with client device 240a for example via the Internet. The opponent may be known to the user, for example a friend on a social media platform, or he may be unknown to the user, such as a player selected at random from the available players wanting to play at that time. Each player has a colour assigned to them, as defined by a coloured box around their image 401, 402. In this example, the user of client device 240a is the red player and his opponent at 240b is the blue player. The game board 409 is shown in the middle of the display.

At the beginning of the game, each player starts with the same game board, transmitted to their devices by the game code, executed at the server 205. The game board comprises a grid of tiles. Each player is assigned an equal number of tiles in a pre-determined area defining a player territory with a different area being assigned to each player such that their player zones do not overlap. The player territory of each player is defined by a border 404, 405 of the colour assigned to the player, such that, in this example, the dashed border 405 defines the (red) territory of the user of client device 240*a* and the dash/dot border 404 defines the (blue) territory of his opponent. During gameplay, the players perform moves to try to expand their territory as described later. The aim of the game is to finish with the largest territory, that is, the territory containing the largest number of tiles.

A score bar 403 represent proportionally the number of tiles within the player zones of each player. In FIG. 4, 12 tiles fall within the red border 405 and 9 tiles within the blue border 404. This is represented by the proportion of the score bar 403 which is coloured red and blue.

A pacing bar 406 is displayed below the game board. This is used to pace the game so that one player cannot make more than a set number of moves without his opponent making a move.

A booster icon 407 is displayed in the lower left-hand corner. Here, the booster is a 'Paint Brush Booster', which allows a user to change the colour of blocks so that they match adjacent blocks.

If the user clicks on menu button 408, icons appear which allow the user to change the setting of the game, such as turning sounds effects on or off. The user also has the option to return to the main menu or virtual path along which he progresses by playing new levels in the game. This multi-player game is not one of the levels, but an additional game which users can play without affecting their progression along the virtual path.

Figure 5:
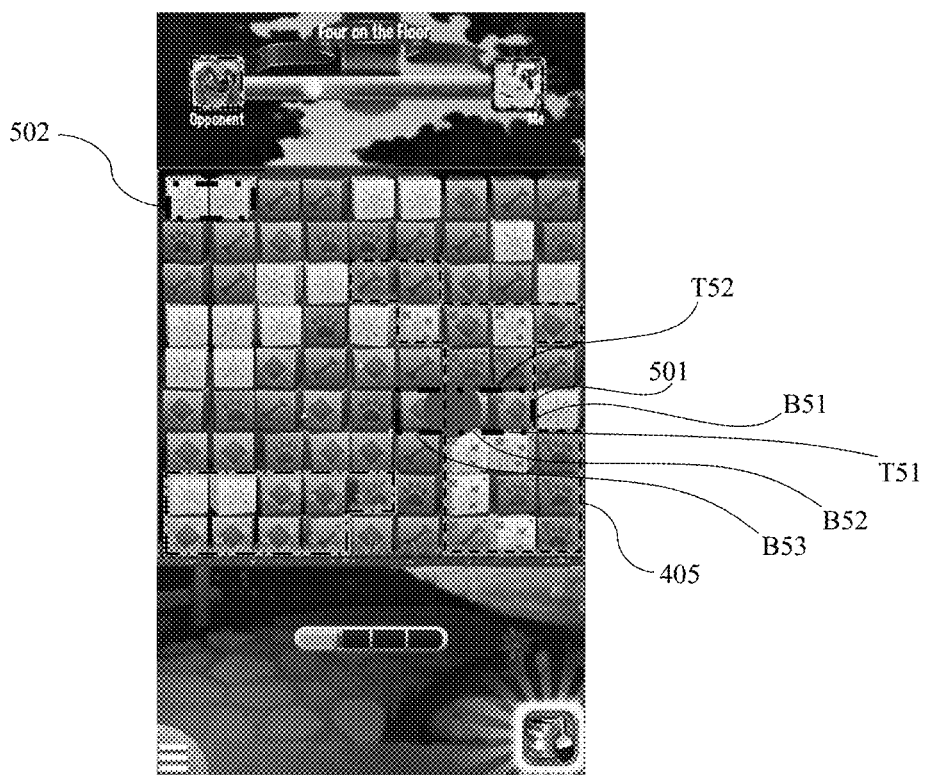
Figure 6:
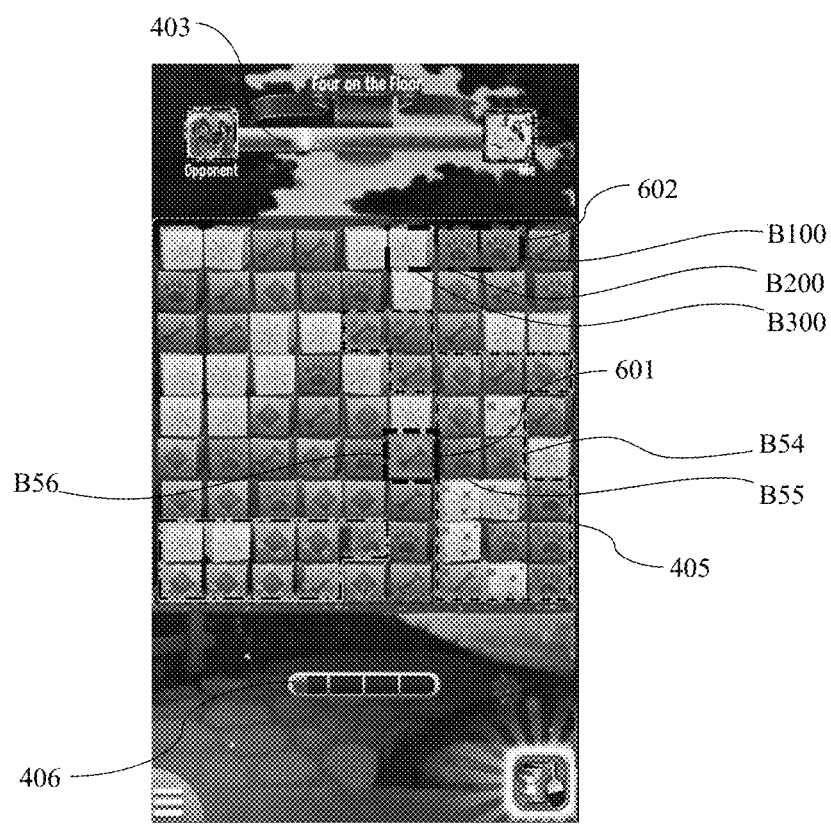

In FIG. 5, the red player selects a group 501 of three adjacent matching purple blocks B51, B52, B53. This step is a game interaction step carried out at the user device 240*a*. The two furthest right of these blocks are positioned on tiles T51, T52 which are within the red border 405, so are in the territory of the red user. Once the user has selected any one of these three blocks, all three of the matching blocks in group 501 are removed and the blocks B54, B55, B56 which were located above, move downwards to fill the gaps left by the deleted blocks. Similarly, blocks above B54-B56 move downwards according to a downwards falling refill physics. Three new blocks B100, B200, B300 shown within outline 602 are spawned to fill the gaps left by the falling blocks, as shown in FIG. 6, using the per set block generation process described above.

The red border 405 has expanded to include tile 601 which was occupied by the matching adjacent blocks 501 but outside the red border 405 in FIG. 5 before the red player had selected them. Thus, the number of tiles within the player zone of the red player has increased, so the proportion of the score bar 403 which is red has increased. If, however, the player had selected a group of adjacent matching blocks such as denoted by 502, none of which were inside his territory, his territory would remain unchanged, and so would the relative scores of the players. However, the blocks would be removed and replaced according to the refill mechanic. Since the red player has made a move without the blue player also making a move, the pacing bar 406 has become emptier.

Figure 7:
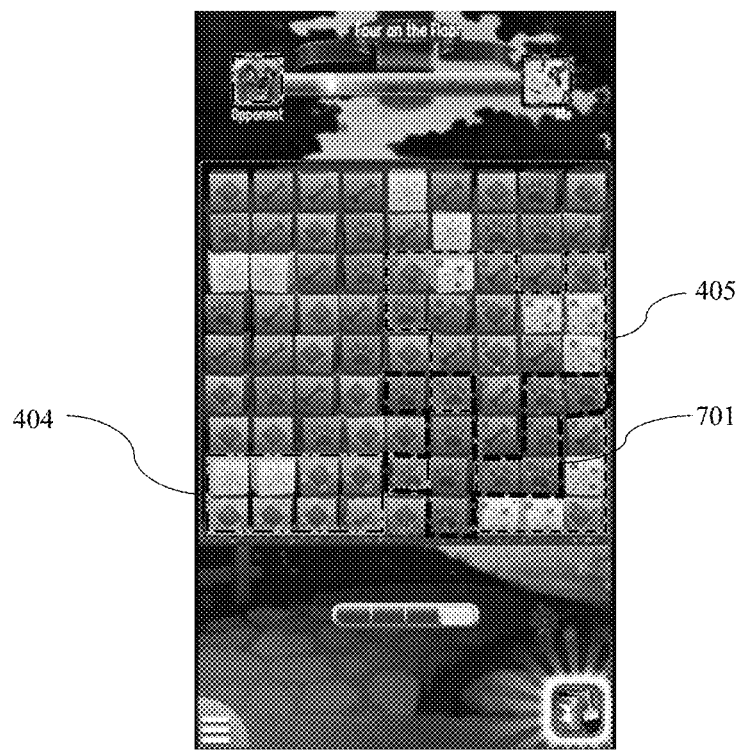

FIG. 7 shows the game board after the red player has made some more moves and expanded his territory to include 27 tiles. The display at the client device 240*a* shows the blue player still with only has 9 tiles in his player territory. This may be because he has not made any plays yet, because the plays he has made have not expanded his player territory, or because of the time lag for data transmission between client devices. Note, however, that due to the novel block generation process described herein the red player can carry on playing on his game board even though updates have not yet been received from the blue players interaction with his game at device 240*b*.

Figure 8:
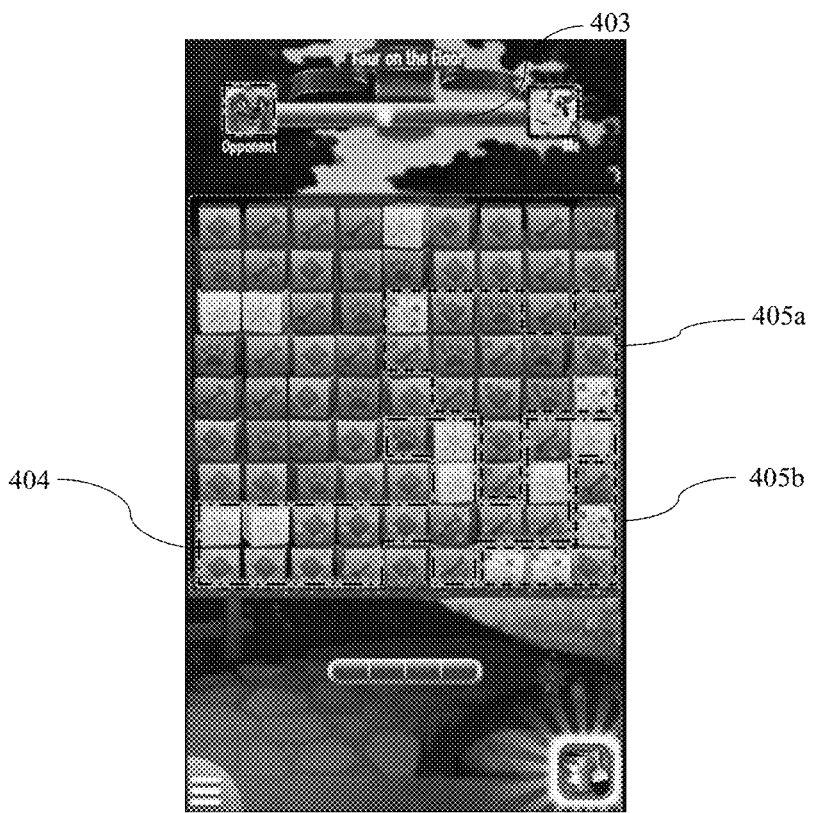

The blue player then selects a group of adjacent blue blocks 701, which has one block within the blue border 404. His player zone then expands to include the tiles where these blocks were. After updating, this is displayed on the red player's device as shown in FIG. 8. Many of the tiles were previously within the player zone of the red player, so the blue player has 'stolen' these tiles from the red player, thus decreasing the number of tiles within the player zone of the red player. This is reflected in the score bar 403, which shows an increase in the blue portion and decrease in the red portion. It can be seen that the red player now has two player zones 405*a*, 405*b*.

Figure 9:
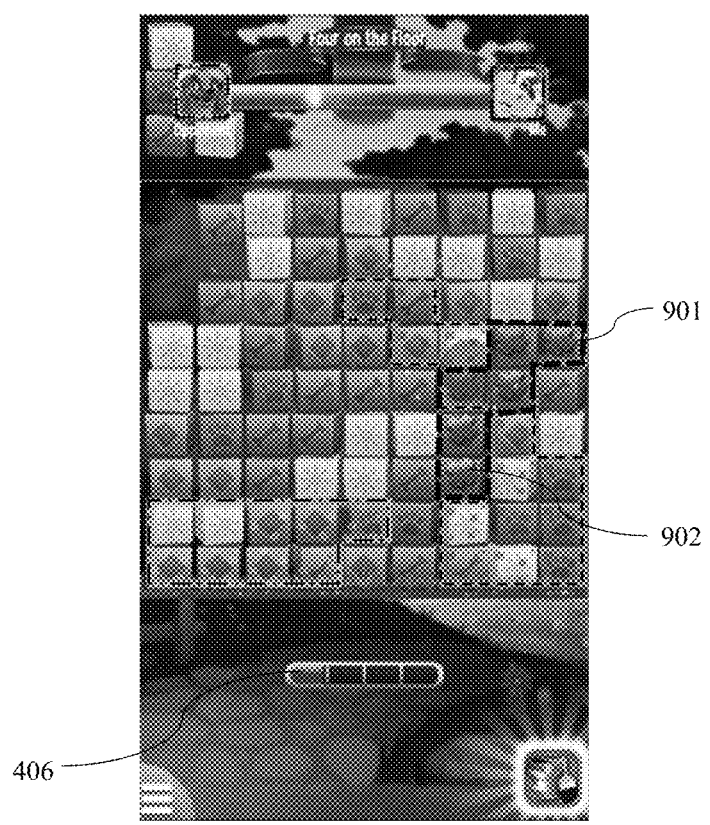

FIG. 9 shows a situation in which the red player cannot make a play. The red player has tried to select a group of matching adjacent blue blocks 901, but has not been allowed to, as indicated by red crosses 902 on the blocks. The reason for this is that he has made too many plays and not enough time has passed since his last play. The player is made aware of this by the pacing bar 406 below the game board. It can be seen here that the pacing bar 406 is more than three quarters empty. The pacing bar 406 must be at least one quarter full for the player to make a play.

The competitive game could have different objectives other than just increasing respective territories. For example, one objective may be to determine who has the most blocks of a certain type (e.g. colour). Another game objective could be the first player to remove a certain number of blocks, or a number of groups of blocks of a minimum size. Other game objectives are possible, and these are given only by way of example in a competitive game.

Figure 10:
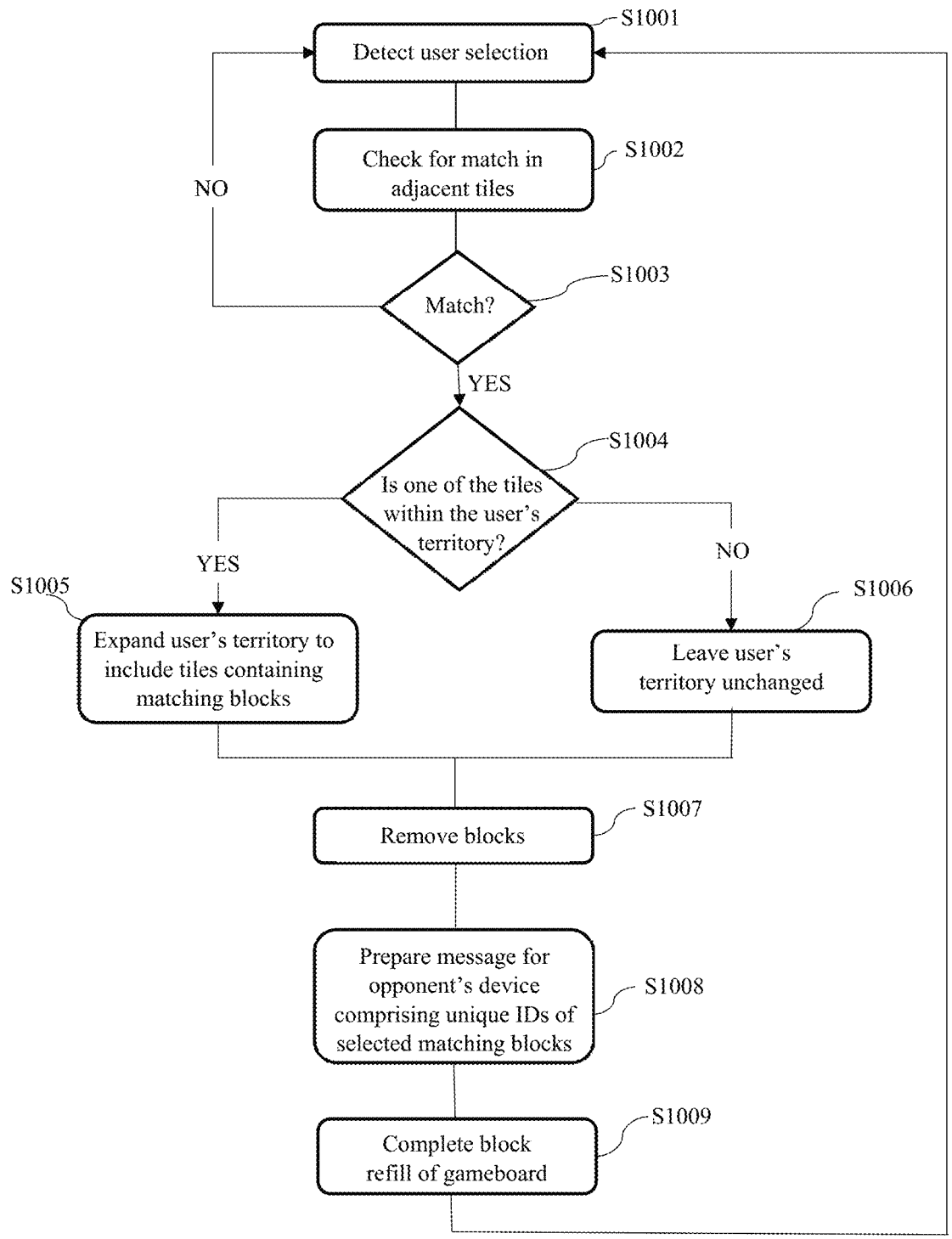
FIG. 10 is a flowchart showing the refill process at the user device.

FIG. 10 shows a flow diagram depicting the removal of blocks from the grid displayed on the user's device. After the user has selected a block for removal, a match check is performed in step S1002 to see if any of the adjacent blocks match the selected block. If the match check returns a positive result, i.e. the characteristics of adjacent blocks match the selected block, the process proceeds to step S1004. If, however, there are no matching adjacent blocks, the system waits for the user to select another block.

After a positive match check result, the system checks to see if any of the tiles containing the matching blocks are within the player zone of the user in step S1004. If they are, the player zone is expanded in S1005, but if not, the player zone remains the same in S1006. The group of selected matching blocks is then removed from the user's game board in step S1007.

Each game element on the game board has its own unique element identifier, which it keeps from the time it is spawned until the end of the game. At step S1008, the user's device prepares a message to send to the opponent's device comprising the unique element identifiers of the matching blocks which were removed in step S1007.

When blocks are removed, the empty tiles left behind are refilled in step S1009. This is achieved by blocks in tiles higher up the game board falling down, and new blocks being generated at the top of the game board, again falling downwards to fill the spaces, until all tiles are filled. The blocks may fill the empty tiles in an alternative manner, for example filling rows from left to right or from both the top and the bottom of a column.

An end trajectory is set for each block that moves during refill. This may or may not correspond to a tile which is empty at the time of spawning, depending on the direction of refill. E.g. if refill is from above, blocks may fall directly into empty tiles. However, if refill is within the plane of the game board, blocks may slide from one position on the game board to another to fill gaps and/or enter the game board at an edge where there is already a gap. There may be as many new blocks as there are gaps to fill The end trajectory is the endpoint destination and may also include the path or route taken by the block to reach that endpoint. The path is how the visual indication of the moving block is rendered on the game board while under the influence of the game physics. In an example, a new block may have a path that does not simply pass over other blocks, but that shows it falling downwards in gaps or along paths between stationary blocks.

Blocks are spawned using deterministic game element generating algorithms as explained above. The game board is divided into sets of tiles, each set having its own spawning algorithm associated with it. In one embodiment, these sets remain static, such that they are constant throughout the game, and are defined prior to the start of the game. In another embodiment, these sets can change during game play. In both of these embodiments, the areas of the sets do not overlap, such that no one tile can be in two different sets. In this example, the game board is divided into columns. Other set configurations are possible, such as splitting the game board into rows. The entry point, the location from which blocks are spawned, is defined by the algorithm. In this case, the entry point is the top tile in the column.

When a new block is generated, it is given a unique element identifier which it keeps until the end of the game. This is used to communicate to the opponent's device which blocks have been removed by the user. The generated blocks can be defined with any parameters, such that they are not limited to coloured blocks and may be, for example, boosters. Both the unique element identifiers and the parameters are defined by the spawning algorithm.

Once a new block is generated, it moves to its endpoint. Here, the endpoint is the lowest empty tile in the column once all of the blocks remaining in the column have fallen to the lowest possible tile. The algorithm and shape of the area controlled by a single algorithm will determine the end point.

It should be appreciated that the steps in FIG. 10 may be performed an alternative order. For example, the message comprising the element identifiers of the selected matching blocks, S1008, may occur before these blocks are removed, S1007.

Figure 11A:
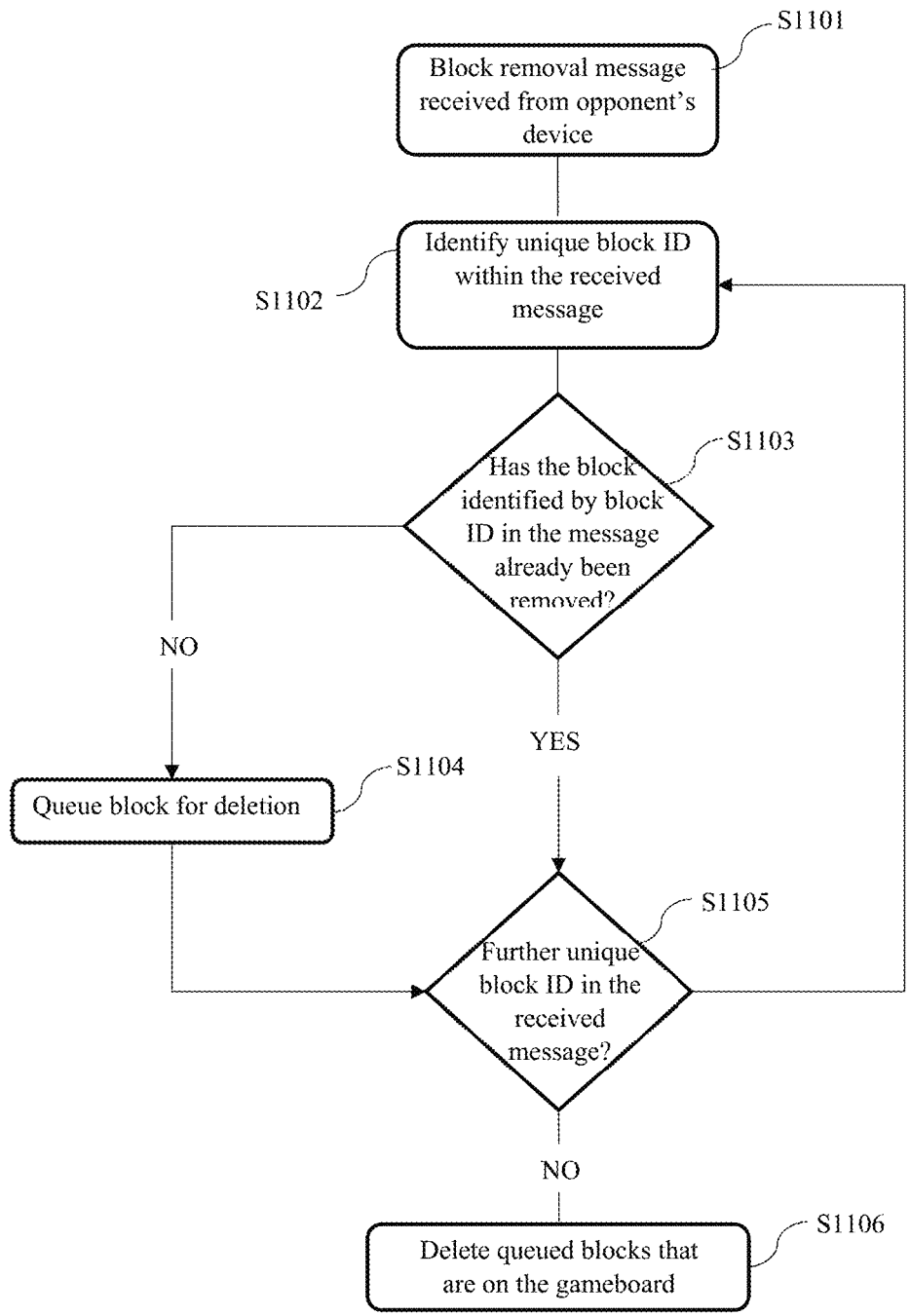
FIGS. 11A and 11B are flowcharts showing a user device responding to update messages.
Figure 11B:
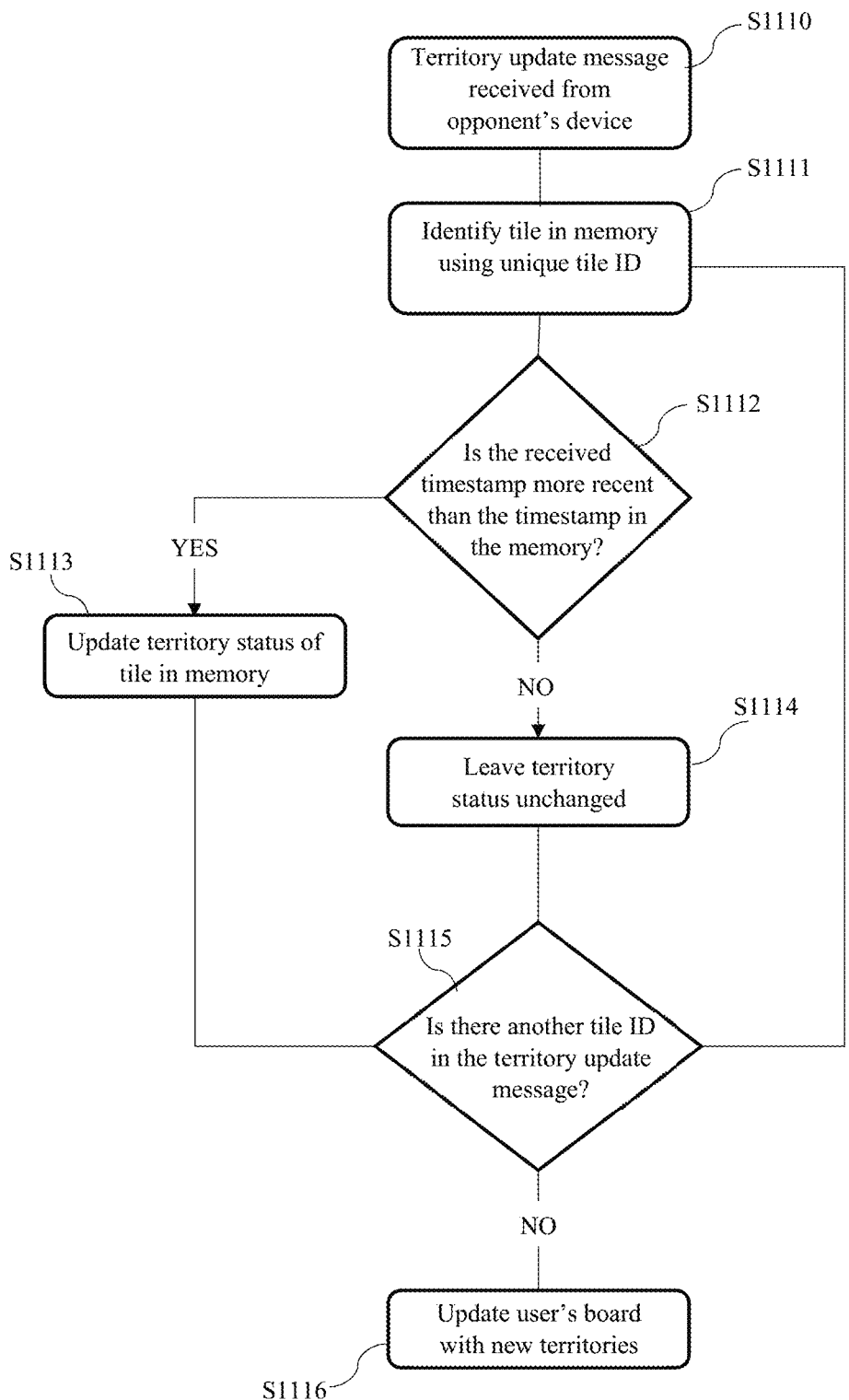

FIGS. 11A and 11B show the steps taken when the user's game board is updated to take into account plays made by his opponent. In step S1101, the user's device receives a block removal message from the opponent's device indicating that the opponent has removed one or more blocks from his gameboard. This message contains the element identifiers of the blocks which have been removed by the opponent.

In step S1102, the game logic seeks to identify an element identifier of a block in the message. It then checks in step S1103 to see if the block in question has been removed from the gameboard already. This may be done by comparison with a stored list of deleted blocks, which speeds up the check, but other methods can be utilised. If the block has not previously been removed, the block with that block ID is queued for deletion in step S1104. The process then moves to step S1105, where the game logic checks to see if there is a further block ID received in the message. If at step S1103 it was found that the block had already been removed from the gameboard in step S1103, the process moves straight to step S1105.

If the game logic finds there is a further block ID in the received message, the process returns to step S1102 to identify the next block ID, and the process repeats for this further received block ID. This may be repeated for each further block ID that may be present in the received message.

Once no further block IDs are found in the received message in step S1105, the process proceeds to step S1106, where the blocks with unique block IDs which have been queued are deleted from the gameboard.

In some instances the blocks in the deletion queue may not have been spawned on the user's gameboard yet. If this is the case, the block IDs of these blocks remain in the deletion queue until they are spawned on the user's gameboard. When new blocks are spawned, the block IDs of the new blocks are checked against the block IDs in the deletion queue. If any of the IDs match, the blocks are removed from the gameboard. This check may be performed every time new blocks are spawned.

In some embodiments, the game logic does not check if the block has already been removed from the gameboard in step S1103. It may proceed from step S1102 directly to step S1104. If there is a case where a block ID is received in the message which is associated with a block which has already been deleted from the gameboard, the block ID will be added to the deletion queue but no action will be taken after that with regards to the block ID as there is no block on the gameboard with that ID, nor will one with that ID be spawned as play proceeds.

If the territory (zone) of a player changes when he makes a move on his own gameboard, a separate territory update (player zone update) message is sent to his opponent's device. Each tile is stored with territory status information indicating who the tile belongs to (the territory it is in), e.g. no-one, player 1, player 2, player 3 etc. and a timestamp relating to when the territory status information was last updated.

The territory update message contains the tile ID of the tiles which are newly included in the user's territory and the timestamp indicating the time at which the update occurred. Note that all tile IDs in an update message have the same timestamp. In one embodiment, when the gameboard is initially populated at the beginning of the game all tiles are given a territory timestamp of '0' or some other indicator representing an initiator or starter value, e.g. 'null'. The territory update message is received at the user device in step S1110. The game logic then identifies the tile in the memory which has the first tile ID contained in the territory update message in step S1111.

The game logic takes the first tile ID and compares the timestamp associated with the tile IDs received in the message to the timestamp associated with that tile ID stored in the memory in step S1112. The memory stored timestamp indicates the last time the territory of that tile was updated in the memory. If the received timestamp is more recent than the memory timestamp, the territory status of the tile is updated in step S1113. This status indicates which player's territory the tile is in. If, however, the timestamp in the memory is more recent (i.e. the user of the receiving device has made a move more recently which means the tile is now in his territory) the territory status is left unchanged. This is represented by step S1114, but it will be appreciated that this is an optional step—the flow could proceed directly to step 1115.

In step S1115, the game logic checks to see if there are any more tile IDs in the received message. If there are, the next tile ID is identified in S1111 and the process continues. If there are no more tiles to be check, the process continues to step S1116, where any change to the territory status of a tile may cause a corresponding visual indication on the respective player's device to change, to illustrate the change in territory as discussed earlier.

It should be appreciated that the steps in FIG. 11 may be performed an alternative order. For example, the blocks indicated in the message may be removed before the player zones are checked and altered.

Figure 12:
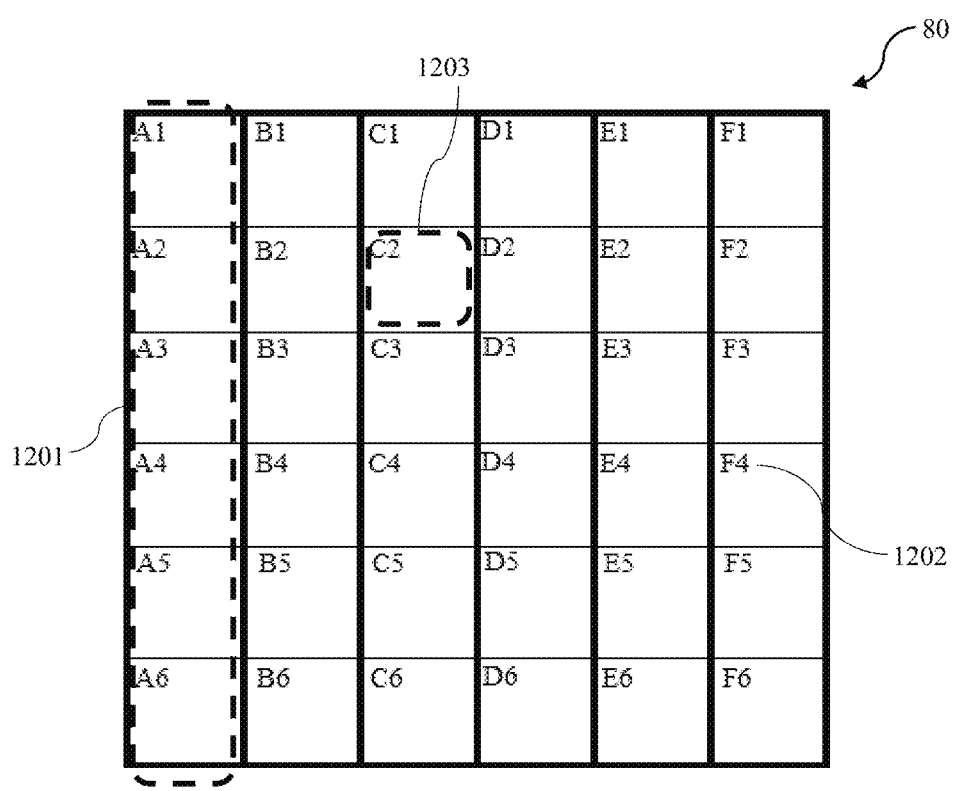
FIG. 12 shows a grid of a game board.

Both players start the game with the same game board. FIG. 12 shows the grid of the game board made up of individual tiles 1203. Tile IDs 1202 are used to identify each tile 1203. Data about the game elements occupying each tile 1203 is associated with the tile ID 1202 in a data structure. The grid 1500 is split into sets 1201 as indicated by the thick borders of the columns. The grid 1500 may be split up in to sets 1201 in a different manner, for example in one embodiment the grid 1500 is split into rows. The sets 1201 each have their own deterministic spawning algorithm associated with them. These sets 1201 and algorithms are the same for both the user's and his opponent's game boards, such that, when a new block is spawned in a particular column on the user's game board, the same block will be spawned on the opponent's game board in that column without any information about the spawned block being communicated between the two client devices 240a, 240b. Different spawning rules may apply to each set 1201 of tiles, but are the same on the two players' game boards. The sets 1201 associated with each spawning algorithm may change during game play, but they must change at the same time on each of the player's game boards so that the sets and algorithms still match.

Since the game boards and algorithms are the same for all players, the amount of information which needs to be sent between client devices is reduced. There is no need to transmit information about spawned blocks, for instance. The block removal message sent between client devices need only comprise the element identifiers of the blocks to be removed. The territory update message identifies changes in the territory states of tiles. This significantly decreases the time taken for the message to be transmitted. However, some time lag still exists.

To increase the speed of the game yet further, the players may make moves simultaneously. The user does not have to wait for his opponent to make a move before he can make another. He can continue to play his instance of the game on his game board. The refills are completed as the player removes game elements. The client device receives asynchronous updates from the opponent's device indicating the deletions from the game board of the opponent. The pacing bar 403 introduces an element of pace control, such that one player cannot make lots of moves without his opponent making any and so gaining a large score advantage.

When a player makes a move and removes blocks from the game board, his game board is updated immediately such that there is a visual indication of the move he has made displayed on his display straight away. Since there is a time lag from one player making a move and the message being received at the other player's device, the opponent may not see the move made by the first player until a time later. The opponent may have made a move to remove blocks in the interim period before the blocks removed by the first player have been removed from his game board, so the two game boards of the players may look different at the same point in time. However, the new blocks spawned will be the same independent of the order they are spawned in because of the matching algorithms for each area of the game boards. Also, using element identifiers to identify which blocks need to be removed means that the correct blocks will be removed, even if they have moved tile location on the opponent's game board since the first player removed them from his game board.

Figure 13:
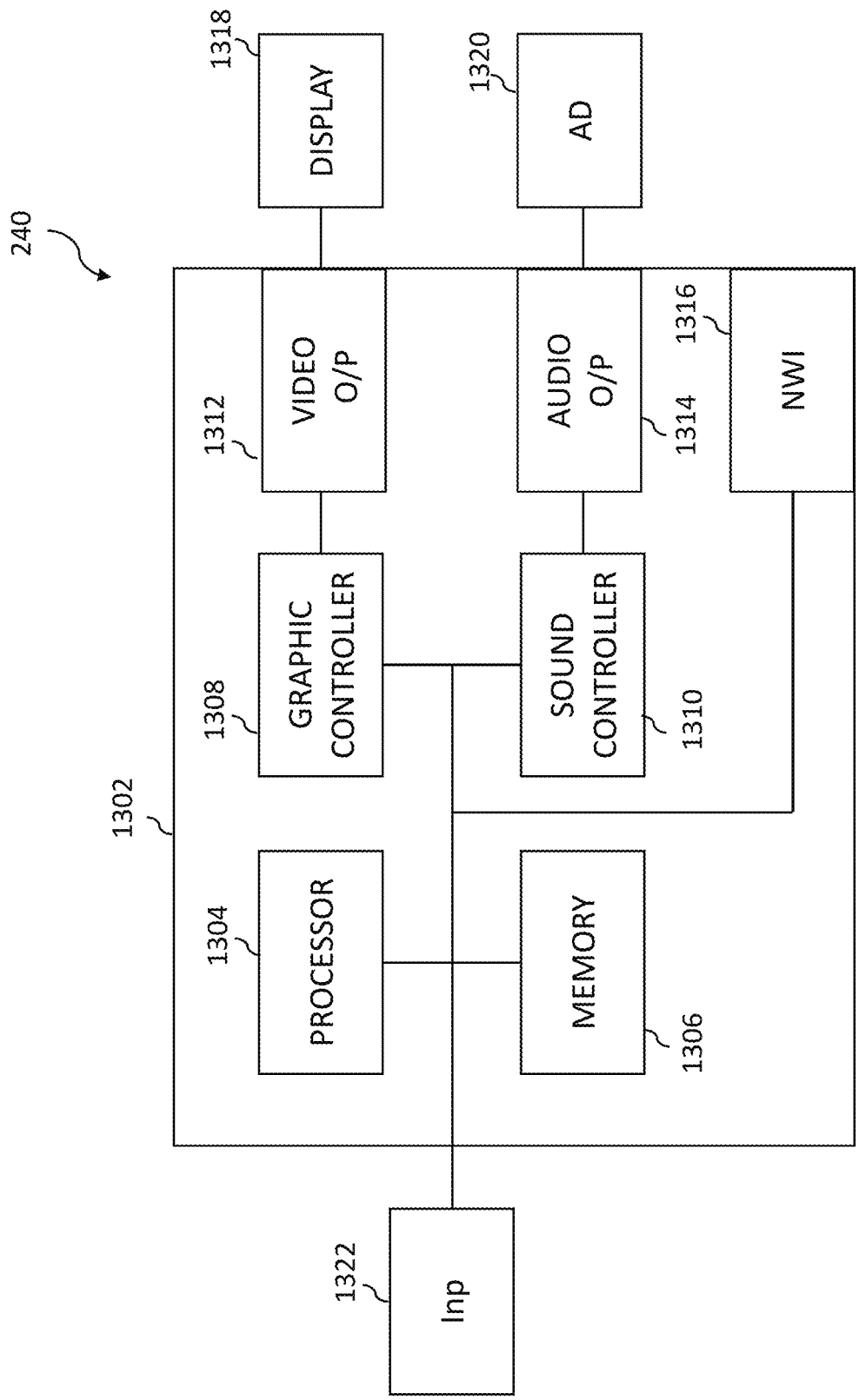
FIG. 13 is a schematic block diagram of the architecture of a computer device.

A schematic view of a user or computing device 240 according to an embodiment is shown in FIG. 13. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional blocks may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of a keyboard, mouse, touch screen, joystick or game controller. It should be appreciated that the display 1318 may in some embodiments also provide the input device 1322, for example, by way of an integrated touch screen.

The blocks of the controller 1302 are configured to communicate with each other via an interconnect such as a bus or any other suitable interconnect and/or by point to point communication.

It should be appreciated that, in some embodiments, the controller 1302 may be implemented by one or more circuits, at least in part.

It should be appreciated that embodiments may be deployed in different system architectures. For example, the computer game may be implemented as a computer game that is stored in the memory 1306 of the user device 240. However, when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline play when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 240 to allow the user device 240 to render and display graphics and sounds in a browser of the user device 240.

Figure 14:
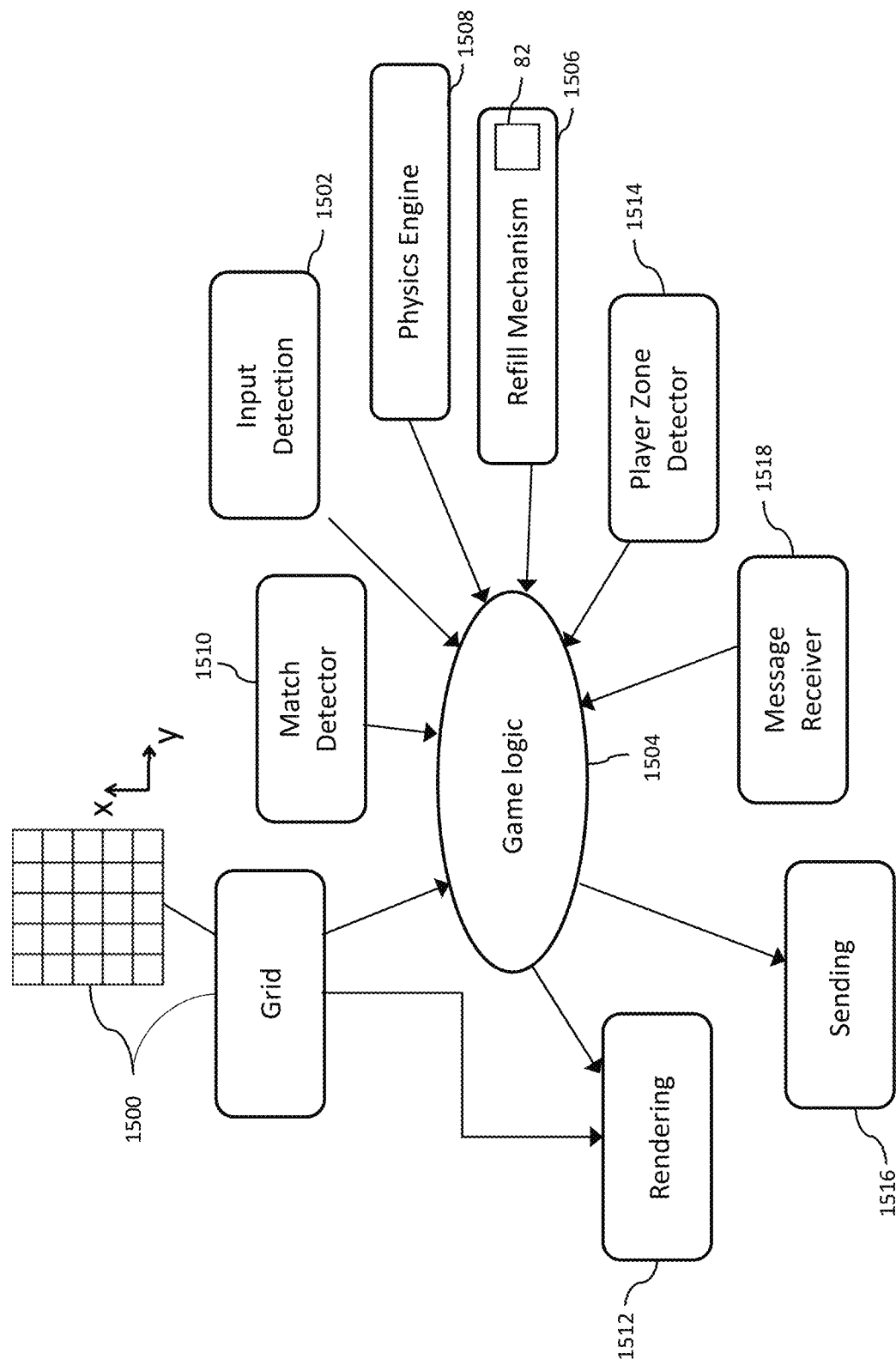
FIG. 14 shows a view of the functional components of the game.

FIG. 14 shows a schematic representation of the functional blocks of an embodiment of the present invention used to enable game play, such as that discussed above.

Input detection 1502 captures the user input and feeds the input to the game logic 1504. The user input can be provided via any suitable user input device, such as those described above. In the context of the game, this user input can be used to indicate which game objects have been selected by a user, and thus to indicate the blocks to be removed and the element identifiers to be sent in a message to the opponent's device. The game logic 1504 will process the information provided by the user input. The game logic 1504 may then determine if a valid selection has been made, and what the outcomes of the selection should be.

A grid component 1500 stored in a memory provides a grid representation of the game board as shown schematically in FIG. 15. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. that match detector component 1510, and the refill mechanism component 1506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 1504 will check if a game element satisfies the rule or rules for a valid match using the match detector logic 1510. The rule or rules may define whether or not certain match criteria have been satisfied. The specific conditions may be dependent on the particular game being played.

Thus, the game logic controls the rules for determining if a valid match is present or selected. The game logic will have access to data for each tile including its tile ID designating its location on the grid 1500, and associated tile data providing information about the contents of that tile, e.g. the game element within that tile or at least one characteristic associated with the game element within the tile. The game logic will thus be able to determine if a valid match condition has been met. If a valid match condition is met, the game elements in the match may be removed from those respective tiles. The grid can be considered as a map which may be used to determining the relative positions of tiles on the game board from the tile ID. In embodiments of the present invention, the grid 1500 is implemented as a two-dimensional grid. By splitting the grid 1500 into row or column sets of tiles, each with their own deterministic game element generating algorithm, the game board may be simplified to a set of one-dimensional sub-grids. The grid 1500 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

The game logic 1504 will also check to see if any of the tiles of the selected matching game elements are within the player zone of the player making the selection using the player zone detector 1514. If any of the tiles are within his player zone, the zone will be expanded and the associated tile data is updated.

Once a match between blocks has been successfully made across a number of tiles of the grid, these blocks may be removed and the respective tiles will become empty. At this stage, a refill of the empty tiles is required based on the refill mechanism 1506. The refill mechanism may also have conditions on which it relies. For example, other moves or actions taking place on the game board may have to be completed before the refill mechanism can take place.

Each tile of the grid 1500 may be associated with data to indicate a status such as filled or unfilled (empty). Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 1508, or as the endpoint of a new block entering the game board. The physics engine component 1508 is configured to control the movement of moving game elements in the display. The physics engine 1508 may be part of the game logic 1504.

A filled tile will be treated by the game logic as a solid entity, preventing any other game objects from passing through this particular tile. By filled tile it is meant that the tile is occupied by a game element, e.g. a block, a booster etc. In this way, the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

A message comprising the element identifiers of the blocks which have been successfully selected, matched, and removed by the player is then sent to his opponent by the sending component 1516. This message is received at the opponent's device by the message receiver 1518, which passes the element identifiers of the blocks to the game logic 1504 to be deleted from the game board in the manner discussed above. Again, the player zone detector 1514 checks to see if the player zones need to be altered, and the refill mechanism 1506 refills and empty tiles.

The invention claimed is:

1. A method of controlling a user interface of a computer device, the computer device executing a computer executable game playable by a user at that computer device, the method comprising:

rendering on the user interface an initial game board comprising a plurality of user selectable game elements of at least first and second types arranged on respective tiles, detecting that a user has selected a group of adjacent game elements of the same type, removing game elements in the selected group, executing a refill process wherein vacancies left as a result of removing the game elements are filled by moving existing game elements of the game board into the vacancies and spawning new game element to complete a next game board, wherein the tiles of the game board are arranged in multiple sets, the method comprising spawning a deterministic sequence of new game elements for each respective sets of tiles, each set controlled by respective deterministic game element generating algorithm which spawns the new game elements in the deterministic sequence for its associated set.

2. A method according to claim 1 wherein the sets of tiles are static.

3. A method according to claim 1 wherein the tiles are arranged in an array of rows and columns on the game board, and wherein each set comprises a row, column, or n by m grid of the array.

4. A method according to claim 1 wherein each set has a tile identified as an entry point, the next game element in the deterministic sequence being spawned at the entry point.

5. A method according to claim 4 wherein the next game element spawned at the entry point moves to a next vacant tile in a predetermined tile pattern in the set, and a further next game element is spawned at the entry point.

6. A method according to claim 1 comprising the step of transmitting to a remote computer device at which the computer executable game is being played by another user an update message identifying game elements for updating the game board at the remote computer device.

7. A method according to claim 1 comprising the step of receiving an update message from a remote computer device at which the computer executable game is being played by another user, the update message identifying game elements which have been removed from the game board at the remote device, the method further comprising the step of removing such game elements from the game board at the computer device and executing the refill process.

8. A method according to claim 1 wherein the deterministic game element generating algorithm operates according to different spawning rules for each set.

9. A method according to claim 6 wherein the refill process is executed independently of the transmission of the update messages.

10. A method of controlling at least first and second user interfaces of respectively first and second computer devices, each computer device executing an instance of a computer executable game, playable by a first user at the first computer device independently of a second user at the second computer device, the method comprising:
rendering on each of the first and second user interfaces an initial game board comprising a plurality of user selectable game elements of at least first and second types, arranged on respective tiles of the game board, wherein the initial game board rendered on the first computer device is the same as the initial game board rendered on the second computer device,
rendering on each user interface both a first player zone and a second player zone, the first and second player zones associated respectively with the first and second user,
detecting, at the first user interface, that a user has selected a group of adjacent game elements of the same type,
removing the game elements in the selected group from the first interface,
executing a refill process wherein the vacancies left as a result of removing the game elements are filled by moving existing game elements of the game board into the vacancies and spawning at least one new game element to complete a next game board,
extending the player zone of the first user if the selected group comprises at least one game element in the player zone associated with that user, wherein spawning the new game element comprises generating one or more new game element for at least one of a plurality of sets of tiles on the first user interface independently of generating one or more new game elements for at least one of a plurality of sets of tiles on the second user interface according to a deterministic game element generating process whereby the sequence of game element types spawned for each set is the same for each user interface.

11. A method according to claim 10 wherein the sets of tiles are static and not modifiable during play.

12. A method according to claim 10 wherein the sets of tiles are different from the player zones.

13. A method according to claim 10 comprising the step of transmitting an update message from the first computer device to the second computer device, the update message identifying removed game elements.

14. A method according to claim 13 comprising the step of receiving the update message at the second computer device and executing the refill process to refill vacancies indicated by the removed game elements in the update message.

15. A method according to claim 10 comprising the step of transmitting a player zone update message between the first and second computer devices comprising identifiers of tiles that have changed a player status as a result of extending the player zone.

16. A method according to claim 15 comprising receiving the player zone update message and visually indicating the extended player zone based on the tile identifiers.

17. A computer device comprising:
a user interface,
one or more processor configured to execute a computer executable game to be played by a user at the computer device, the processor configured to:
render on the user interface an initial game board comprising a plurality of user selectable game elements of at least first and second types arranged on respective tiles,
detect that a user has selected a group of adjacent games elements of the same type,
remove game elements in the selected group, and
execute a refill process wherein vacancies left as a result of removing the game elements are filled by moving existing game elements of the game board into the vacancies and spawning at least one new game element to complete a next game board wherein tiles of the game board are arranged in multiple sets, the processor configured to spawn a deterministic sequence of game elements for each respective set of tiles by a respective deterministic game element generating algorithm of a game element generator.

18. A computer device according to claim 16 comprising a network interface, wherein the one or more processors is configured to transmit via the network interface an update message to a remote computer device, the update message identifying removed game elements.

19. A computer device according to claim 16 wherein the network interface is configured to receive an update message from a remote computer device, the update message identifying game elements removed from a game board on a remote computer device, wherein the one or more processors is configured to remove the identified game elements from the game board and to execute the refill process to replace them.

20. A non-transitory computer readable medium comprising computer readable instructions which when executed by a processor causes the method of claim 1 to be performed.

* * * * *